(12) United States Patent
Lau

(10) Patent No.: US 6,181,084 B1
(45) Date of Patent: Jan. 30, 2001

(54) BALLAST CIRCUIT FOR HIGH INTENSITY DISCHARGE LAMPS

(75) Inventor: Lake Lau, West Covina, CA (US)

(73) Assignee: EG&G, Inc., Wellesley, MA (US)

( * ) Notice: Under 35 U.S.C. 154(b), the term of this patent shall be extended for 0 days.

(21) Appl. No.: 09/258,003

(22) Filed: Feb. 25, 1999

Related U.S. Application Data

(60) Provisional application No. 60/100,226, filed on Sep. 14, 1998.

(51) Int. Cl.[7] .................................................. G05F 1/00
(52) U.S. Cl. ..................... 315/291; 315/307; 315/DIG. 5; 363/89
(58) Field of Search ..................... 315/291, 297, 315/307, 209 R, 200 R, 224, DIG. 5; 263/89, 17

(56) References Cited

U.S. PATENT DOCUMENTS

| | | | |
|---|---|---|---|
| 4,709,323 | * 11/1987 | Lien | 363/97 |
| 5,568,041 | * 10/1996 | Hesterman | 323/207 |
| 5,747,942 | * 5/1998 | Ranganath | 315/224 |
| 5,786,992 | * 7/1998 | Vinciarelli et al. | 363/89 |
| 5,912,812 | * 6/1999 | Moriarty, Jr. | 363/89 |
| 5,932,976 | * 8/1999 | Maheshwari | 315/291 |
| 5,933,340 | * 8/1999 | Adamson | 363/97 |

\* cited by examiner

Primary Examiner—Haissa Philogene
Assistant Examiner—Tuyet T. Vo
(74) Attorney, Agent, or Firm—Iandiorio & Teska

(57) ABSTRACT

A ballast circuit for a high intensity discharge lamp includes a boost converter, responsive to a dc input voltage, for providing a boosted dc output voltage; a boost controller, responsive to the boosted dc output voltage, for driving the boost converter to maintain the boosted output voltage at a predetermined level; a buck converter, responsive to the boosted dc output voltage, for providing a reduced dc output voltage; and a buck controller, responsive to the reduced output voltage, for driving the buck converter to operate the discharge lamp in a transition mode and maintaining the reduced dc output voltage at a preselected level for operating the discharge lamp in a steady state mode.

12 Claims, 7 Drawing Sheets

BALLAST CIRCUIT FOR HIGH INTENSITY DISCHARGE LAMPS

RELATED APPLICATIONS

This application claims the benefit of U.S. Provisional Application No. 60/100,226 filed Sep. 14, 1998.

FIELD OF INVENTION

This invention relates to high intensity discharge lamps, and more particular, to a ballast circuit for a high intensity discharge lamp which is more efficient and requires fewer components than previous ballast circuits.

BACKGROUND OF INVENTION

High intensity discharge (HID) lamps provide light by producing an arc between an anode and a cathode, rather than energizing a filament. These lamps include dc metal halide lamps and high pressure Xenon lamps which combine high luminance and good color retention. Applications include low dc input, portable light fixtures and ac powered fiber-optic illuminators used for industrial and medical lighting.

Typical ballast circuits take a low input, ac or dc, and amplify the input over several stages producing high currents and thus requiring circuits which can control the current to provide a more steady current thereby providing a more steady light output, i.e. no flickering of the light. However, because these circuits operate at higher currents, the circuits must include heavy duty components specially designed to carry such high currents which further adds to the expense of producing these circuits. Moreover, because the ac voltages include high frequencies, the circuits must protect against acoustic arc resonance induced by the high frequencies which further causes the light to flicker.

By requiring numerous and complex circuits to accommodate the above requirements, there is a high power loss in the form of heat due to the high current through so many different circuits. This further requires a means for cooling the circuit by a cooling interval before relighting the lamp as well as the need for actively cooling the circuits by including fans, further adding to the current consumed by the circuit to operate the fans and further increasing the power losses.

As a result, these lamps are neither energy efficient nor inexpensive to produce and operate.

SUMMARY OF INVENTION

It is therefore an object of this invention to provide a ballast circuit for a high intensity discharge lamp which is more efficient than prior ballast circuits.

It is a further object of the present invention to provide such a circuit which is cost effective to implement.

It is a further object of the present invention to provide such a ballast circuit which may be produced using standard, inexpensive components.

It is a further object of the present invention to provide such a ballast circuit which has much fewer components than prior art ballast circuits.

It is a further object of the present invention to provide such a ballast circuit which operates at a lower current than prior art ballast circuits.

It is a further object of the present invention to provide such a ballast circuit which produces less heat than prior art ballast circuits.

It is a further object of the present invention to provide such a ballast circuit which eliminates flickering induced by high frequencies.

It is a further object of the present invention to provide such a ballast circuit which produces a steady output to eliminate flickering.

The invention results from the realization that a smaller, more compact and more efficient ballast circuit for a high intensity discharge lamp can be achieved by initialling boosting the input voltage to a higher level, thereby reducing the current to a proportionally lower level then flirter tailoring the voltage for the transition to the steady state mode of operation of the discharge lamp to minimize current levels being manipulated, to reduce power losses to heat, and reduce the number of components required and their complexity, and then bucking the voltage back down to the lower voltage and proportionally higher current required for operating the lamp.

This invention features a ballast circuit for a high intensity discharge lamp. There is a boost converter, responsive to a dc input voltage, for providing a boosted dc output voltage. A boost controller, responsive to the boosted dc output voltage, drives the boost converter to maintain the boosted output voltage at a predetermined level. There is a buck converter, responsive to the boosted dc output voltage, for providing a reduced dc output voltage. A buck controller, responsive to the reduced output voltage, drives the buck converter to operate the discharge lamp in a transition mode and maintain the reduced dc output voltage at a preselected level for operating the discharge lamp in a steady state mode.

In a preferred embodiment, the boost converter may include an inverter, responsive to the dc input, for producing an ac output. The boost converter may include a step-up transformer, responsive to the ac output, for producing a boosted, alternating output. The boost converter may include a rectifier, responsive to the boosted, alternating output, for producing the boosted dc output voltage. The buck controller may include a variable pulse width generator, responsive to the boosted dc output voltage, for providing a pulsed, reduced voltage output. The boost converter may include a resonant voltage divider, responsive to the reduced, pulsed output, for producing the reduced output voltage. The buck converter may include an output filter, responsive to the reduced output voltage, for eliminating ripple current, limiting electromagnetic interference, and reducing flicker of the discharge lamp. The output filter may be incorporated into the resonant voltage divider. There may be an voltage over protection circuit, responsive to a voltage differential between the reduced dc output voltage and the voltage at the lamp, for preventing the variable pulse width generator from producing the high voltage, pulsed output. There may be an ignitor, responsive to said boosted output, for igniting a high intensity discharge lamp. There may be an input filter, responsive to the dc input voltage for eliminating noise from the dc input voltage.

The invention also features a ballast circuit for a high intensity discharge lamp having a boost converter, responsive to a dc input voltage, for providing a boosted dc output voltage, a buck converter, responsive to the boosted dc output voltage, for providing a reduced dc output voltage and a control circuit, responsive to the boosted dc output voltage and the reduced dc output voltage, for driving, respectively, the boost converter to maintain the boosted dc output voltage at a predetermined level and the buck converter to decrease the boosted output voltage to the reduced output voltage and maintain the reduced output voltage at preselected, steady state level.

DISCLOSURE OF PREFERRED EMBODIMENT

Other objects, features and advantages will occur to those skilled in the art from the following description of a preferred embodiment and the accompanying drawings, in which.

Figure 1:
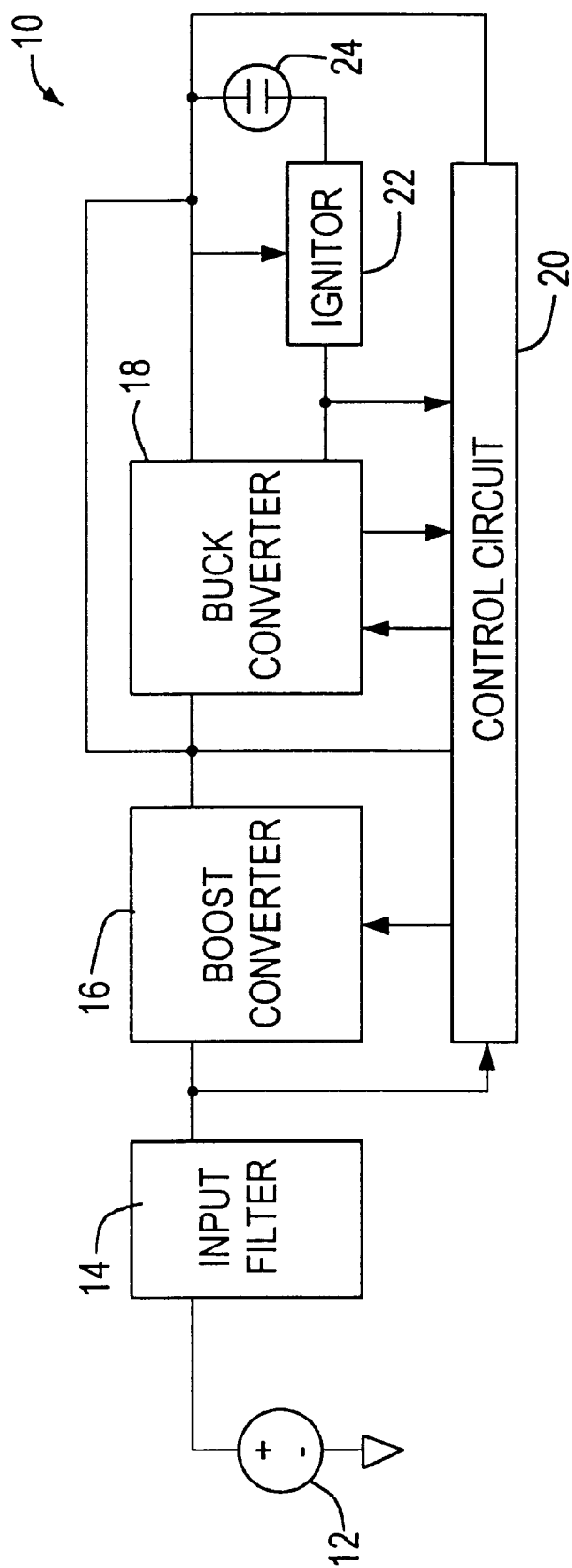
FIG. 1 is a schematic block diagram of a high intensity discharge lamp system including the ballast circuit of the present invention comprising a boost converter circuit, a buck converter circuit and a controller circuit.

Generally, ballast circuit 10, FIG. 1, includes a boost converter 16, buck converter 18 and control circuit 20, responsive to both boost converter 16 and buck converter 18. Input filter 14 receives dc input 12 which may be, for example, 12–24 volts, and filters out noise and ripple which may affect the remainder of circuit 10. Boost converter 16 boosts the smoothed dc input from filter 14 to a much higher level, for example one hundred volts above the operating voltage of high intensity discharge lamp 24, but typically 160 Vdc which is beyond the EMI threshold in order to avoid harmonics which would cause the light to flicker. The EMI threshold is the level of electromagnetic interference that would start to cause the arc to move about the electrode surfaces. The exact value is dependent on the lamp design.

However, this is not a necessary limitation of the invention, as the novelty of the present invention lies in the initial boosting of the input voltage to reduce current. By initially boosting the voltage to a much higher level, the current throughout the circuit is necessarily and significantly reduced: typical prior art ballast circuits operate at 10 amps or higher while with the present invention operation can occur at 2 amps. Reducing the current avoids the need for heavy duty, costly components as well as the need for additional current controlling circuits and thus not only allows the use of common, "off the shelf" components, but also reduces the actual number of components required. This also eliminates the need for cooling means such as fan or large heat sinks, further reducing the number of components and thus the cost. Moreover, reducing the current and the components needed to accommodate higher currents makes the circuit much more efficient by reducing $I^2R$ losses.

The boosted voltage from boost converter 16 is provided to high intensity discharge (HID) lamp 24 and ignitor 22 which uses the voltage to ignite lamp 24. Once HID lamp 24 is lit, buck converter 18 transitions the boosted voltage to a reduced level, typically the operating voltage of HID lamp 24. Control circuit 20 is responsive to both boost converter 16 and buck converter 18 to ensure that proper voltages are maintained by controlling the current in the respective converters.

Figure 2:
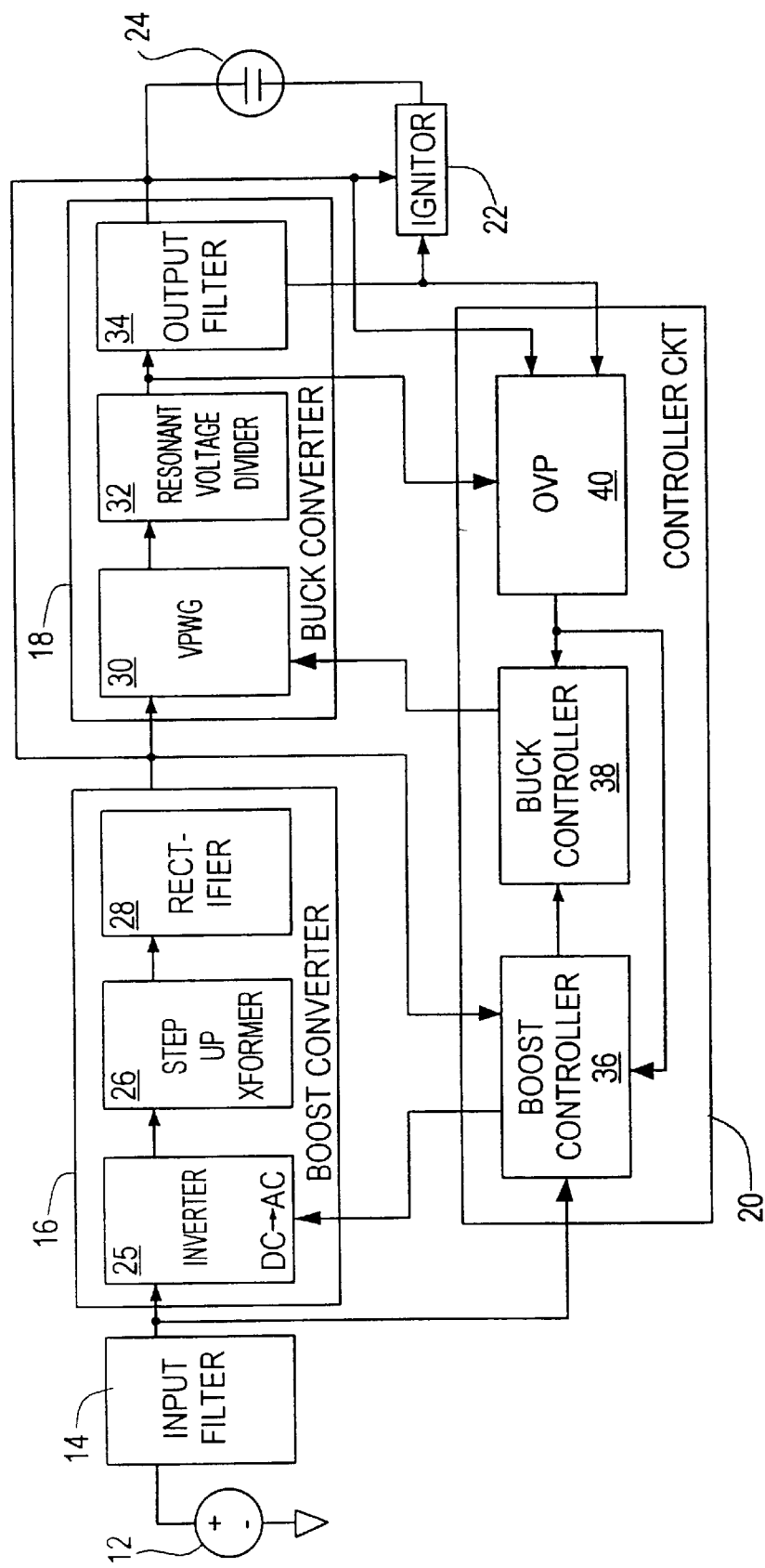
FIG. 2 is a more detailed schematic block diagram of FIG. 1 in which the boost converter, buck converter and controller circuits are further broken down into respective component circuits.

Boost converter 16, FIG. 2, may include inverter 25 which converts the smoothed dc input from filter 14 to an alternating voltage. This alternating voltage is thereafter provided to step-up transformer 26 which boosts the voltage to the predetermined level, e.g. 160 volts. The boosted, alternating voltage is then rectified by rectifier 28 such that the output of boost converter 16 is a boosted dc voltage. As discussed above with reference to FIG. 1, this voltage is used to ignite HID lamp 24.

Control circuit 20 may include boost controller 36 which is responsive to the boosted dc output that controls the current in boost converter 16 to maintain a constant, boosted dc output.

Once lamp 24 has been lighted, the voltage supplied to lamp 24 must be reduced to the operating voltage of lamp 24. Lighting lamp 24 enables buck converter 18 which may include variable pulse width generator (VPWG) 30 which initially produces boosted pulses to resonant voltage divider 32, but transitions the voltage such that the voltage across lamp 24 approaches a steady state voltage, typically the operating voltage of the lamp. Resonant voltage divider 32 provides a constant voltage without harmonics which would otherwise cause lamp 24 to flicker.

Output filter 34 controls ripple current to lamp 24 and further limits electromagnetic interference to provide a constant output from lamp 24 and also eliminate flickering of lamp 24. This provides not only constant light but also increases the life of lamp 24 and improves its efficiency by improving lamp stability. Lamp instability accelerates electrode erosion. The eroded material migrates to the lamp walls, reducing light output. A second effect of lamp instability is to cause the control circuit to constantly adjust the boost circuit in an attempt to maintain stable operation. This is costly in terms of power loss.

Control circuit 20 may also include buck controller 38, which controls the current to buck converter 18, and thus lamp 24, to control the reduction of the output voltage during the transition from igniting lamp 24 to steady state operation of lamp 24. Buck controller 38 also provides the signal that enables ignitor circuit 22.

Over voltage protection (OVP) circuit 40 may also be included in control circuit 20. OVP 40 shuts down the high voltage trigger pulse to ignitor 22 after a predetermined period of time in order to protect lamp 24 by sensing the voltage differential between the boosted output at the cathode of lamp 24 and the reduced voltage at the anode of lamp 24. Once the lamp has ignited, the signal ceases because there is no longer a differential at the lamp. If lamp 24 does not ignite, OVP 40 shuts down boost controller 36 which in turn shuts down buck controller 38 to prevent continuous striking of the lamp.

Figure 3:
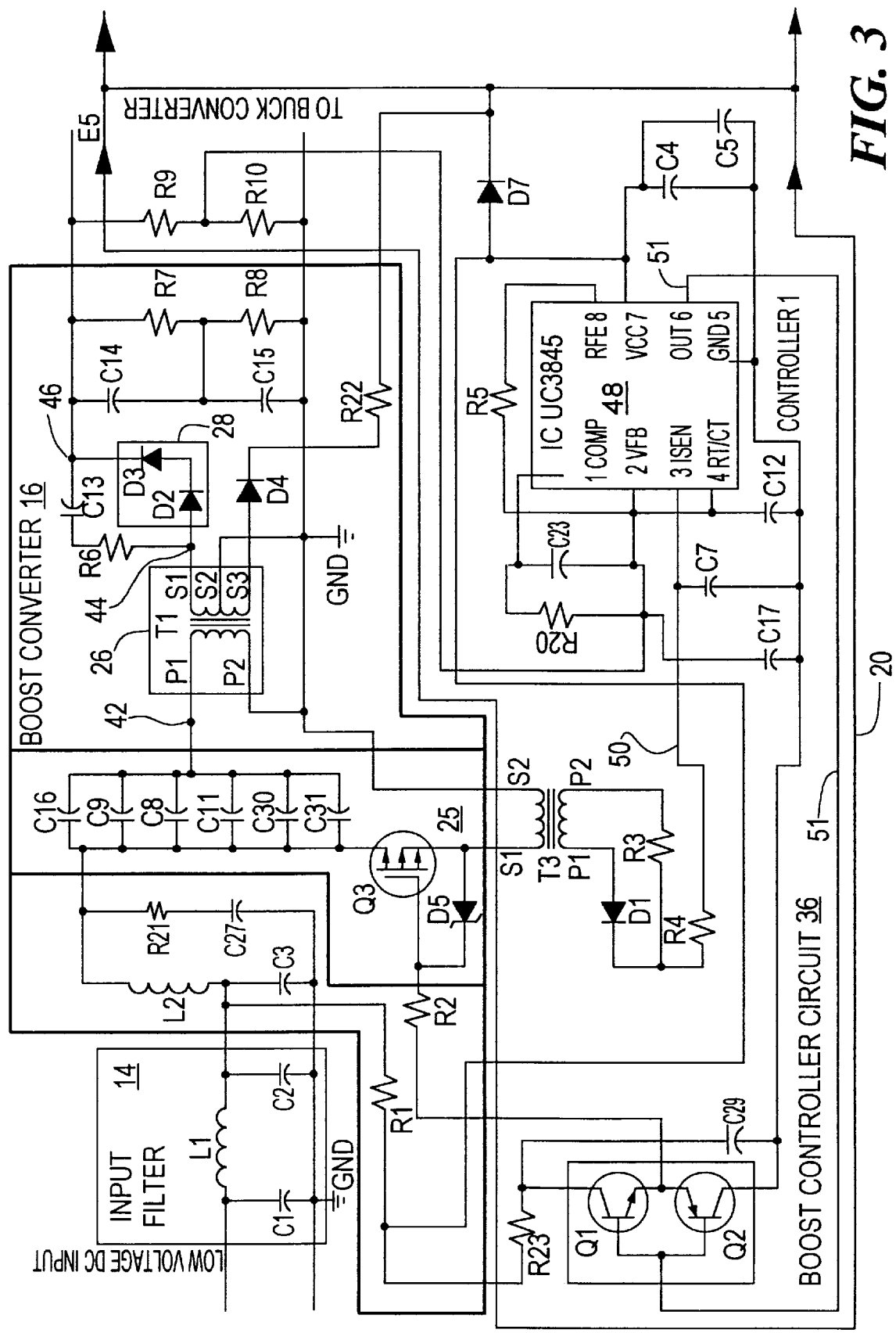
FIG. 3 is a schematic diagram of a boost converter and a portion of the controller circuit according to the present invention.

Input filter 14, FIG. 3, may include for example an LC network, well known in the art, for smoothing the input to remove any ripple which may adversely affect the remainder of circuit 10 and thus lamp 24. Inverter 25 converts the dc input to an alternating current. Inverter 25 may include transistor Q3 and diode D6 which form an oscillator that, in response to the dc input, produces an alternating output at node 42.

The alternating output at node 42 is submitted to step-up transformer 26 which may include transformer T1 to produce a boosted, pulsed output at node 44, typically boosted to 160 volts to minimize EMI harmonics as discussed above. This 160 volt, pulsed output is provided to diodes D2 and D3 of rectifier 28 to produce a boosted (160 volt) dc output at node 46.

Series capacitors C14 and C15 provide additional filtering to smooth the boosted dc output at node 46 while resistors R7 and R8 provide a voltage divider to ensure a constant voltage across C14 and C15 and thus a constant output voltage.

Boost controller 36 of control circuit 20 monitors the current of boost converter 16 to ensure that boost converter 16 maintains a constant output voltage. First controller 48, such as a UC3845 pulse width modulation controller available from Unitrode Integrated Circuits, Merrimack, N.H., drives paired transistors Q1 and Q2 which in turn drive Q3 of inverter 25 discussed above. Controller 48 senses current on fine 50, which is proportional to the current across the primary windings of step-up transformer 26, to maintain a constant voltage level at node 42 and thus ultimately a constant boosted dc output at node 46. In response to the current sensed on line 50, first controller 48 sends a control signal on lie 51 to transistors Q1 and Q2 which drive Q3 thereby adjusting the output voltage accordingly.

Figure 4A:
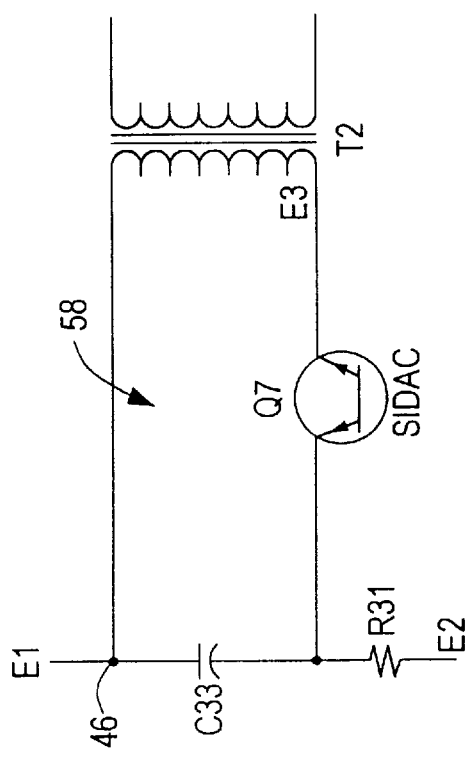
FIG. 4A is a schematic diagram of a trigger circuit used to ignite a high intensity discharge lamp having an ignition voltage of less than 10 KV.

At start up, the boosted output voltage generated by boost converter 16 appears at node 46, FIG. 4A, of trigger circuit 58 which represents a trigger circuit requiring a trigger voltage less than 10,000 volts, for example, where lamp 24 is a metal halide lamp. Transistor Q7 directly drives transformer T2 to develop sufficient voltage across lamp 24 to create an arc and thus light the lamp.

Figure 4B:
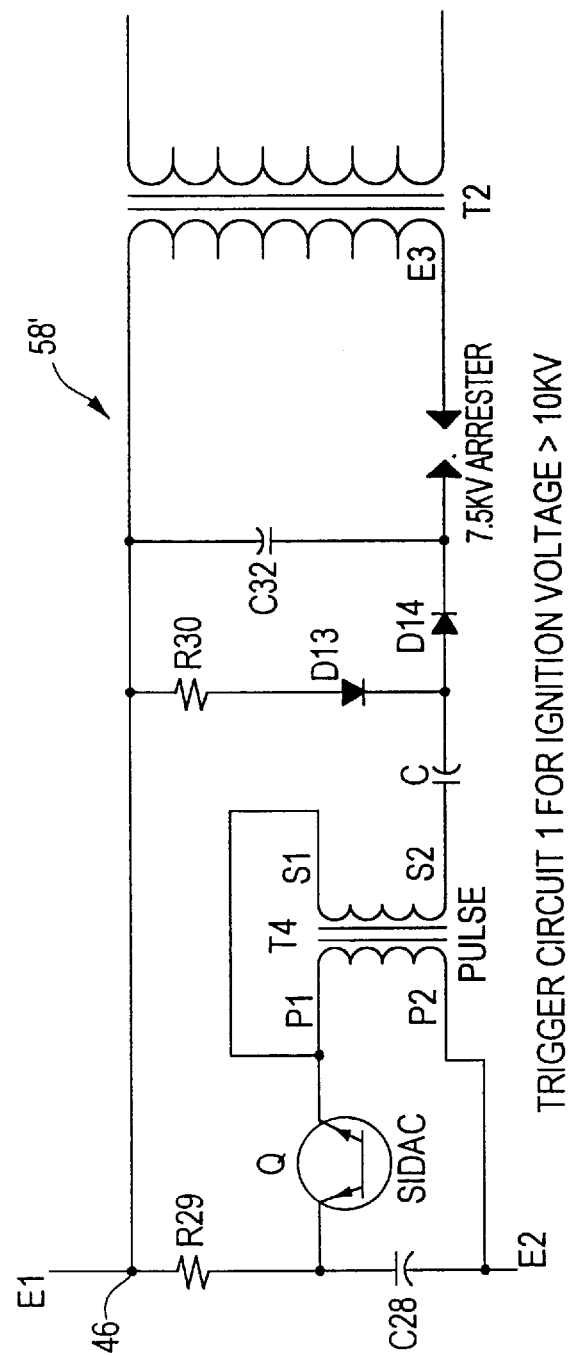
FIG. 4B is a schematic diagram of a trigger circuit, similar to FIG. 4A, used to ignite a high intensity discharge lamp having an ignition voltage greater than 10 KV.

For applications which require a higher trigger voltage, e.g. greater than 10 KV such as a high pressure Xenon lamp, trigger circuit 58', FIG. 4B, may include SIDAC Q7 which charges capacitor C32 to discharge across the gap of transformer T2 into the primary winding to ignite lamp 24.

Figure 5:
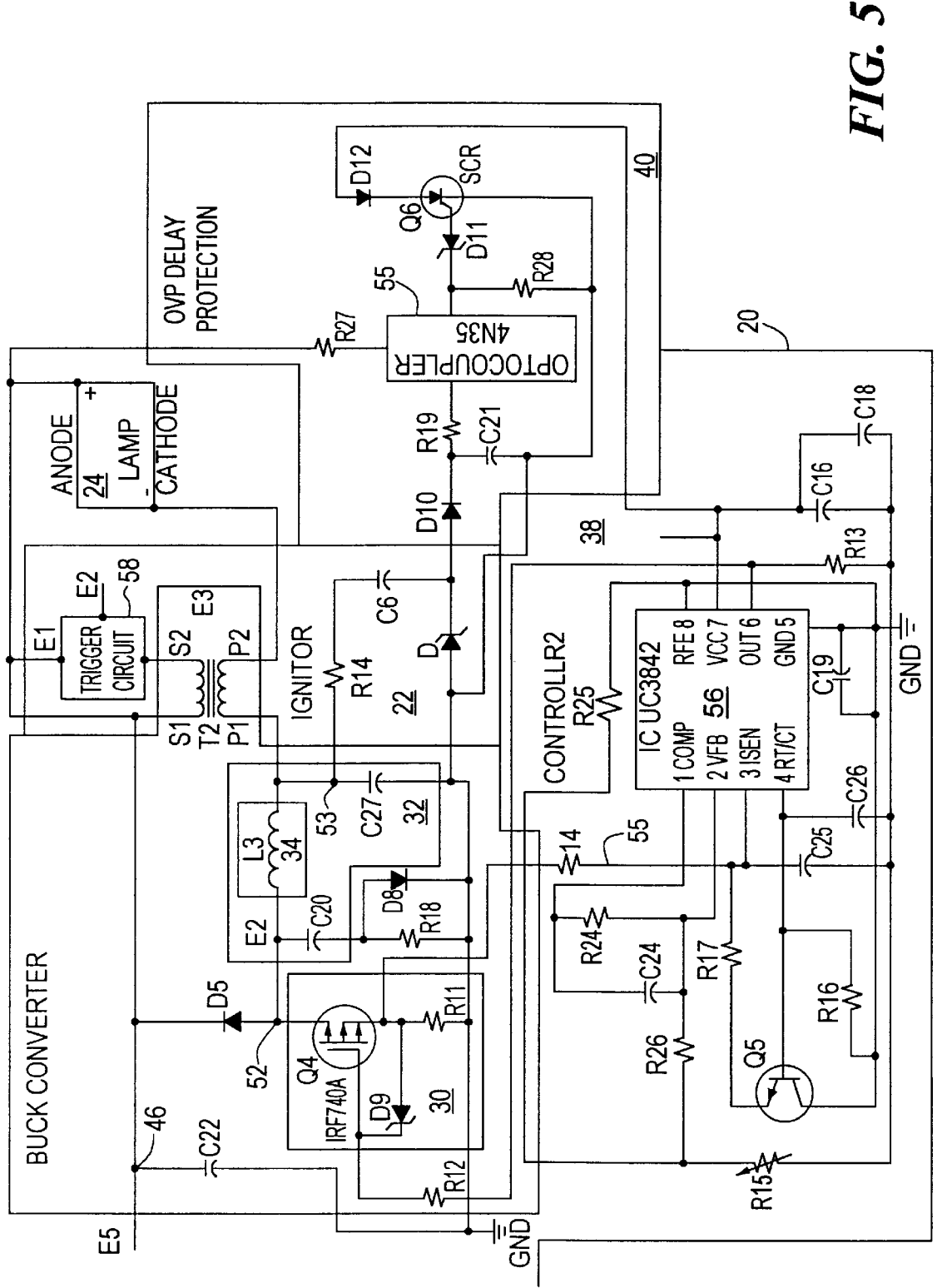
FIG. 5 is a schematic diagram of a buck converter and the remaining portion of the controller circuit according to the present invention.

In order to protect the remainder of the circuit if ignition does not occur and lamp 24 does not light, OVP 40 of control circuit 20 shuts off trigger 58 after a predetermined period of time as discussed above. OVP 40, in response to a differential across lamp 24, forces first controller 48, FIG. 3, of boost controller 36 to send a control signal to second controller 56, FIG. 5, to shut down buck controller 38 to prevent continuous restriking of lamp 24. If lamp 24 does not ignite, the voltage at node 53, between output filter 34 and resistor R14, is high frequency ac voltage. A portion of this voltage is rectified by Zener diode D and diode D10. Capacitor C21 and resistor R19 control the amount of time required to reach the predetermined voltage provided to optocoupler 55, for example a Model 4N35 available from Motorolla, in order to turn on optocoupler 55. Once turned on, optocoupler 55 generates a high signal trigger to SCR Q6, via Zener diode D11. As SCR Q6 turns on, Vcc pin 7 of second controller 56, which may be a UC3842 pulse width modulation controller available from Unitrode Integrated Circuits, Merrimack, N.H., is pulled to ground via diode D12. In this way, buck controller 38 is shut-down which in turn shuts-own boost controller 36.

If, however, lamp 24 ignites, the voltage at node 53 is a dc voltage which is thus blocked by capacitor C6, preventing current from charging capacitor C21 which would otherwise turn on optocoupler 55.

Initially, there is no output at node 52, because lamp 24 is not on and thus not conducting. Accordingly, there is no current provided to VPWG 30. Once lamp 24 is fired, however, second controller 56 of buck controller 38 is enabled by first controller 48. Second controller 56 thereafter drives transistor Q5 which in turn drives transistor Q4 of VPWG 30. VPWG 30 turns on, an output appears at node 52 and trigger 58 is disabled. When the lamp turns on, the voltage between E1 and E2 drops to a value below the SIDAC firing voltage and the trigger circuit is disabled.

Buck controller 38 monitors the current on line 55 and controls the voltage across resonant voltage divider 32 by sending a control signal from second controller 56 to drive transistor Q5 which in turn drives Q4 of VPWG 30. The invention uniquely incorporates inductor L3 of output filter 34 into resonant voltage divider 32. However, this is not a necessary limitation of the invention as individual voltage divider and filtering circuits may be implemented as shown in FIG. 2. VPWG 30 transitions the output at node 52 to reduce the lamp voltage. The pulse width is adjusted in order to provide a voltage across C27 which is the voltage lamp 24 requires. Note that the voltage across lamp 24 is the difference between the voltage at node 46 and node 52. Thus, buck controller 38 monitors the voltage generated at node 52 and transitions the voltage output at node 52 to gradually increase the voltage such that the voltage across lamp 24 decreases and approaches the preselected operating voltage of the lamp, typically 24 volts. Once the operating voltage is achieved, buck controller 38 monitors the current of Q4 as discussed above to drive Q5 so that a constant operating voltage appears across lamp 24.

Figure 6:
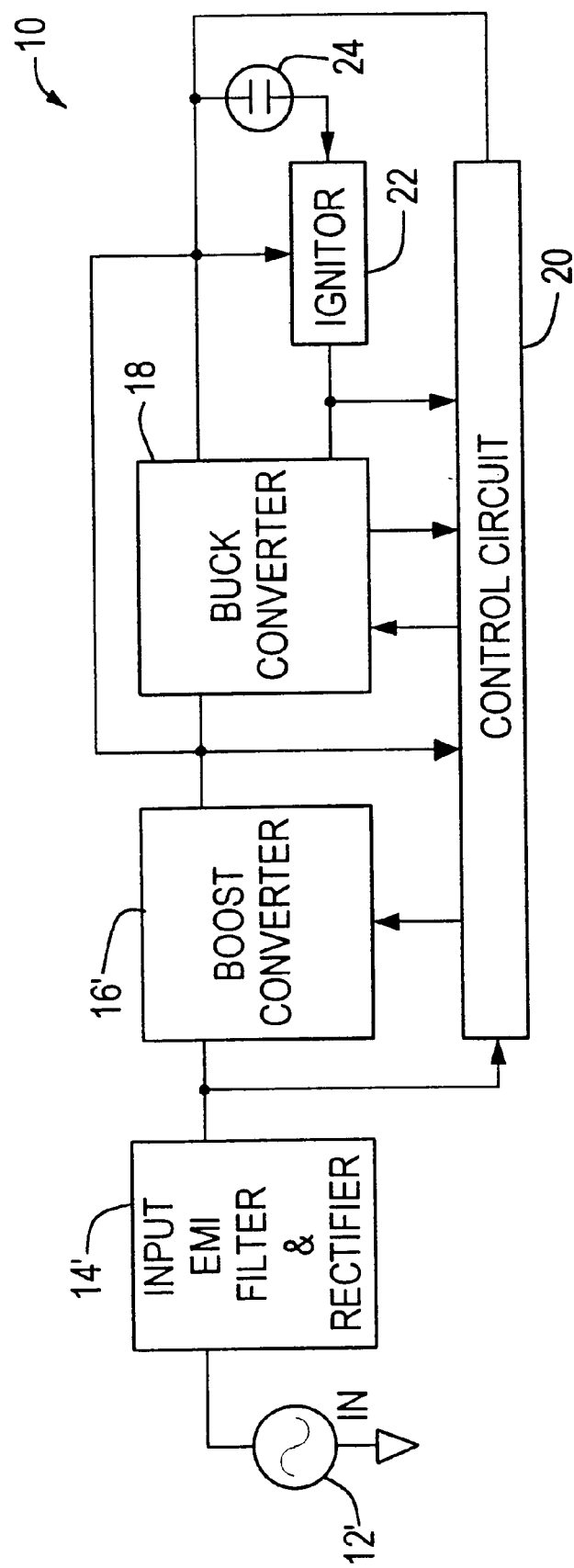
FIG. 6 is a block diagram, similar to FIG. 1, in which the input voltage to the circuit is ac.

The foregoing has been directed to a dc source. However, this is not a necessary limitation of the invention as an ac source may also be used. Alternating current source 12', FIG. 6, such as a typical 110 volt, 10 amp service, may be used to light lamp 24. Source 12' provides an alternating input to input filter 14' which rectifies the ac input and filters it to reduce electromagnetic interference to the boost converter. The remainder of ballast circuit 10 is essentially the same as the circuit discussed above.

Figure 7:
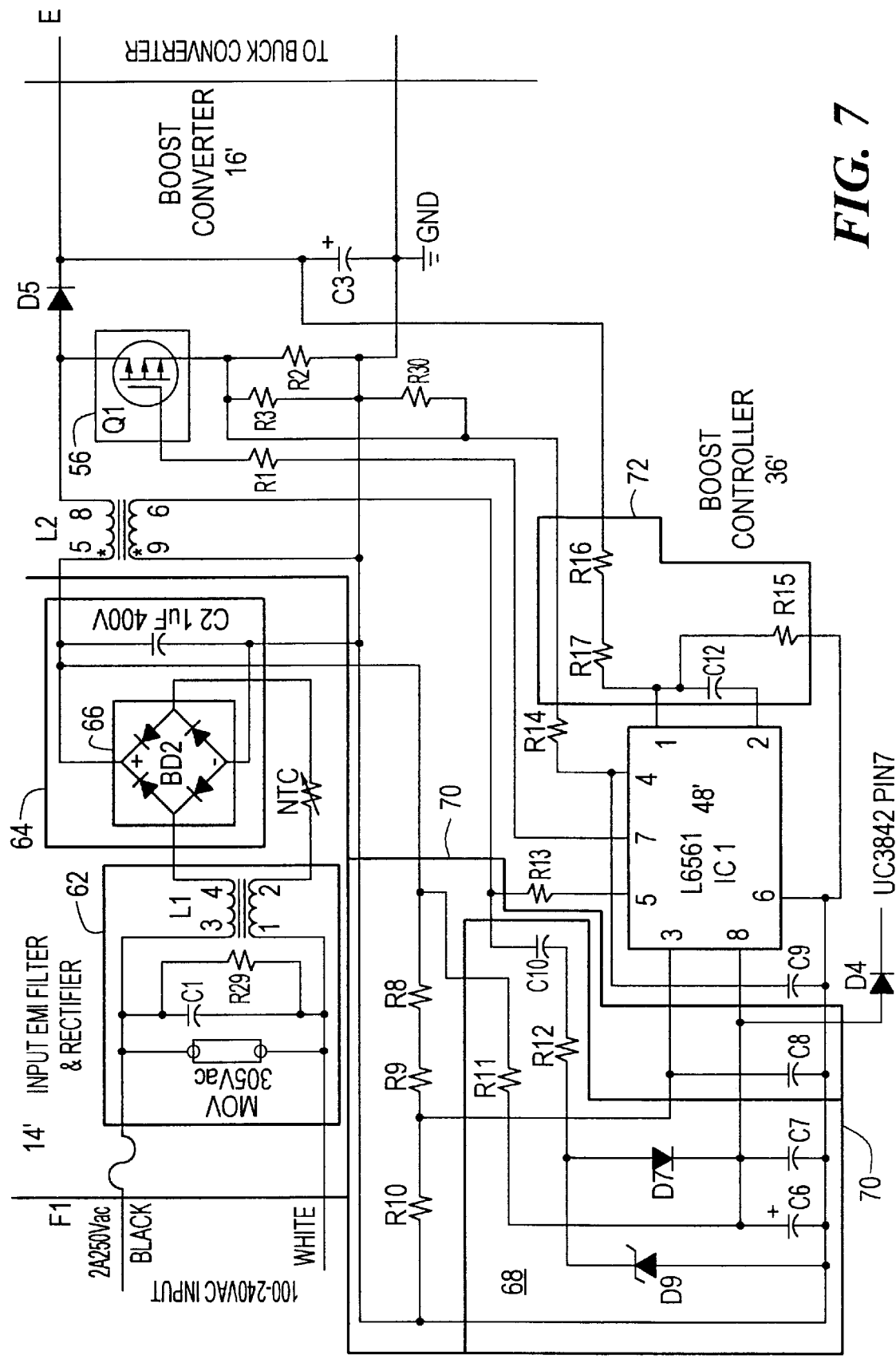
FIG. 7 is a schematic diagram, similar to FIG. 3, including an electromagnetic interference (EMI) filter and rectifier for an ac input voltage to produce a dc input.

Input ac source 12' provides an alternating voltage to EMI filter and rectifier 14'. Input EMI filter and rectifier 14', FIG. 7, may include common mode filter 62 which further reduces high frequency noise. Filtering is accomplished by EMI filter 62 which includes capacitor C1, resistor R2 and windings L1. The signal is rectified by rectifier 64 which provides a high ripple dc output. Rectifier 64 may include, for example wheatstone bridge 66 and capacitor C2.

Boost converter 16 includes step up transformer 26' which in this case includes boost inductor L2, to boost the dc output to the predetermined level as discussed above with respect the dc circuit of FIG. 3. Because the input voltage is already at 120 volts, the rectified dc voltage need only be slightly boosted to reach the desired 160 volts as discussed above.

Power is provided to boost controller 36' which includes first controller 48', for example an L6561 power factor controller available from St-Microelectronic, Phoenix, Ariz. Switch 56 biases controller 48' via biasing circuit 68 which includes resistors R11 and R12, capacitors C6, C7 and C10 and diodes D9 and D7.

The input voltage is sensed by input sensing circuit 70 comprised of resistors R8, R9 and R10 and capacitor C8. Controller 48', in response to the voltage sensed, controls the output voltage with output voltage sensing circuit 72 comprising resistors R15, R16, R17 and capacitor C12. To provide a regulated dc voltage at capacitor C3 which in turn feeds buck converter 18, FIG. 5. The operation of the remainder of the circuit is the same as the dc portion discussed above.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A ballast circuit for a high intensity discharge lamp comprising:
   a boost converter, responsive to a dc input voltage, for providing a boosted dc output voltage;
   a boost controller, responsive to the boosted dc output voltage, for driving the boost converter to maintain the boosted dc output voltage at a predetermined level;
   a buck converter, responsive to the boosted dc output voltage, for providing a reduced dc output voltage; and
   a buck controller, responsive to the reduced dc output voltage, for driving the buck converter to operate the discharge lamp in a transition mode and maintaining the reduced dc output voltage at a preselected level for operating the discharge lamp in a steady state mode.

2. The ballast circuit of claim 1 further including an ignitor, responsive to said boosted output voltage, for igniting a high intensity discharge lamp.

3. The ballast circuit of claim 2 further including an input filter, responsive to the dc input voltage for eliminating noise from the dc input voltage.

4. The ballast circuit of claim 1 in which the boost converter includes an inverter, responsive to the dc input, for producing an ac output.

5. The ballast circuit of claim 4 in which the boost converter further includes a step-up transformer, responsive to the ac output, for producing a boosted, alternating output.

6. The ballast circuit of claim 5 in which the boost converter further includes a rectifier, responsive to the boosted, alternating output, for producing the boosted dc output voltage.

7. The ballast circuit of claim 1 in which the buck converter includes a variable pulse width generator, responsive to the boosted dc output voltage.

8. The ballast circuit of claim 7 in which the buck converter further includes a resonant voltage divider, responsive to the reduced, pulsed output, for producing the reduced output voltage.

9. The ballast circuit of claim 8 in which the buck converter further includes an output filter, responsive to the reduced output voltage, for eliminating ripple current, limiting electromagnetic interference, and reducing flicker of the discharge lamp.

10. The ballast circuit of claim 9 in which the ouput filter is incorporated into the resonant voltage divider.

11. The ballast circuit of claim 9 further including an over voltage protection circuit, responsive to a voltage differential between the reduced dc output voltage and a voltage at the lamp, for preventing the variable pulse width generator from producing the high voltage, pulsed output.

12. A ballast circuit for a high intensity discharge lamp comprising:
    a boost converter, responding to a dc input voltage, for providing a boosted dc output voltage;
    a buck converter, responding to the boosted dc output voltage, for providing a reduced dc output voltage; and
    a control circuit, responding to the boosted dc output voltage and the reduced dc output voltage, for driving, respectively, the boost converter to maintain the boosted dc output voltage at a predetermined level and the buck converter to decrease the boosted dc output voltage to the reduced dc output voltage and maintain the reduced dk output voltage at a preselected, steady state level, for operating the discharge lamp.

* * * * *